UNITED STATES PATENT OFFICE.

ALFRED HUTCHINSON COWLES, OF SEWAREN, NEW JERSEY, ASSIGNOR TO THE ELECTRIC SMELTING AND ALUMINUM COMPANY, OF SEWAREN, NEW JERSEY.

PROCESS FOR RENDERING AVAILABLE THE PHOSPHORIC ACID IN PHOSPHATE-ROCKS.

1,126,408.  Specification of Letters Patent.  Patented Jan. 26, 1915.

No Drawing.  Application filed December 24, 1912.  Serial No. 738,454.

*To all whom it may concern:*

Be it known that I, ALFRED H. COWLES, a citizen of the United States, and a resident of Sewaren, in the county of Middlesex and State of New Jersey, have invented a certain new and useful Process for Rendering Available the Phosphoric Acid in Phosphate-Rocks, of which the following is a specification.

My invention relates to the production of fertilizers.

It relates particularly to a process for rendering available the phosphoric acid in calcium phosphate rocks, employing potash aluminum silicates as the opening reagent at high temperature.

I have discovered and confirmed by experiment the fact that aluminum phosphate is less stable and soluble than calcium sulfate, and under proper conditions will trade acids. From this discovery and from the knowledge that di-calcium silicate is almost an insoluble body, I have deduced that mixtures may be made and heated together containing calcium phosphate rock and potash aluminum silicates such as feldspar and mica in proportions that there shall be in the mixture two molecular weights of calcium oxid from the phosphate rock to one molecular weight of silica from the various potash aluminum silicated rocks and that the products so formed are largely soluble. Moreover, by experiment I have found that by taking bone ash, apatite, or Florida phosphate rock, and, allowing for the amount of calcium oxid or similar oxids, such as barium or strontium oxids or their molecular proportions of carbonates which act like calcium oxid and treating such compounds as though they were calcium oxid in my formula, using their molecular equivalents, and then adding for each two molecules of lime in the phosphate rock, sufficient feldspar to furnish one molecular weight of silica to each two molecular weights of calcium oxid, or its equivalent, I secure a mixture, which, upon heating to its sintering point, or above, will, upon treating with sufficient acid, liberate all the phosphoric acid contained in the calcium phosphate rock, and also the potassium and aluminum in the potash feldspar rock. Calcium fluorid present before heating must be considered the same as calcium oxid and for it, double the molecular quantity of silica should be added, as, under heating, a fluorid of silicon passes off and the calcium of the fluorid becomes oxidized and combines with its equivalent of silica, forming in this case di-calcium silicate. Using only pure products, a typical formula to represent this reaction can be written as follows, if orthoclase or microclin-feldspar be used.

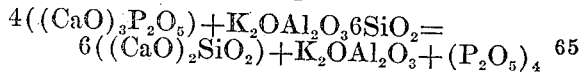

If an alkali silico-aluminate (leucite) is taken containing less $SiO_2$ and more $K_2O$ the reaction can be written as follows:

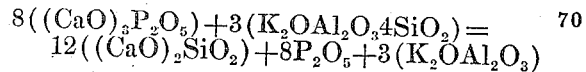

If in the feldspar or phosphate rocks such acid compounds as zirconium oxid ($ZrO_2$), titanium oxid ($TiO_2$) be present, the molecular equivalent of silica should be lessened, accordingly as such acids are to be treated as though they were silica.

In nature neither potash feldspar, nor calcium phosphate rocks, correspond to the above formula. Replacing the potash in the feldspar, may be found sodium oxid, lithium oxid, rubidium or cæsium oxids. All of these oxids should in the above formula be considered as equivalent to the $K_2O$, in calculating the formula by which to work. If alkaline earth oxids be in the potassium aluminum silicates, to the extent that they are present, the molecular equivalent of CaO in the phosphate rock should be omitted to allow for such alkaline earth oxids. If, for instance, hyalophane containing barium oxid be employed the proportions and the reaction would be written as follows:

Hyalophane:

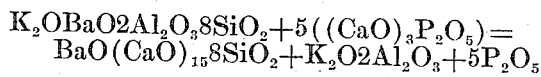

In the end products of these reactions, the $P_2O_5$ should be considered combined with the potash and alumina.

In the calcium phosphate rock there is generally an excess of calcium oxid, in carbonate form over and above that required to form the tri-calcium phosphate sufficient additional feldspar should be employed in these cases, so that the excess of CaO has molecularly the equivalent of one molecular weight of silica to two molecular weights of the calcium oxid present. In this manner we shall always form a di-calcium silicate, or its equivalent, considering the various possible impurities, as mentioned above. After heating, upon treatment with various solvents, the phosphoric acid, potassic oxid and alumina can be brought into solution, either with or without mono-calcium phosphate. For instance, if the product be treated with sulfuric acid, in just sufficient quantity to dissolve the alumina and potash in the above products as shown by the formulæ, the potassium and aluminum will form soluble salts with the sulfuric acid, as sulfates, or a double sulfate, as potash alum, and the phosphoric acid will be left free; hydrochloric acid may be employed in the same way. Ammonium sulfate will also leach out these products. An excess of lime, over and above that which is necessary to form the di-calcium silicate may be used, but, to extract the potash in soluble form with the phosphoric acid, sulfuric acid and other strong acids may be employed. But this means loading the mixture with calcium oxid, or sulfate after leaching, if sulfuric acid be employed and handling larger quantities than are necessary. However, such a product is valuable to use directly on the earth as a fertilizer. Hence, while my result may be thus obtained, it is only obtained at a disadvantage when the product is to be leached.

Two equivalents of lime to one of silica I have thus far found, to be a mixture that perfectly attains the result aimed at, although a lesser quantity of lime than two molecules of lime to one of silica will also act, but never less than one molecule of lime to one of silica in the product.

It is desirable to form alum, as from this potash and alumina can be separated by known means.

My process can be carried on in various forms of furnace; but preferably in a rotary furnace similar to the cement furnaces. The temperature required varies from 1000° to 1700° C, according as the mass is to be sintered, or malted and disintegrated. After sintering, or fusion, followed by disintegration, this product as it comes from the furnace, when reduced to pulverulent form, may be used directly as a fertilizer, or, by employing acids, or solutions of salts, that will not cause insoluble phosphates or aluminates to form, it may be leached, and the phosphoric acid and other valuable salts separated by well-known chemical means.

Of course, sodium oxid, lithium oxid and rubidium and cæsium oxids are the exact equivalents of $K_2O$, in the reactions of this process, and the inventor so considers them, though the stress is laid on the potassium silicates, as the potash salts secured have great and wide use as fertilizers.

Having thus fully explained my process and the manner in which it is to be carried out, what I claim, is:—

1. The process of rendering available phosphoric acid from substances containing tri-calcium phosphate, comprising heating together at a temperature at least as high as their sintering point potash feldspar and calcium phosphate rock, treating the resulting mass with solvents that will not cause insoluble phosphates or aluminates to form, and thus separating from the mass the phosphoric acid, substantially as described.

2. The process of rendering available phosphoric acid from substances containing tri-calcium phosphate comprising heating together at a temperature at least as high as their sintering point tri-calcium phosphate compounds and feldspar treating the resulting mass with solvents that will not cause insoluble phosphates or aluminates to form, and separating from the mass the phosphoric acid, substantially as described.

3. The process of rendering available phosphoric acid from substances containing tri-calcium phosphate which consists in heating together at a temperature at least as high as their sintering point potash feldspar and calcium phosphate rock, and treating the product with acid, substantially as described.

4. The process of rendering available the phosphoric acid from substances containing tri-calcium phosphate, which consists in heating together at a temperature at least as high as their sintering point potash feldspar and calcium phosphate rock and treating the product with sulfuric acid.

5. The process of rendering available phosphoric acid from substances containing tri-calcium phosphate, which consists in mixing together calcium phosphate rock and potash feldspar rock in such proportions that the mixture shall contain two molecular weights of calcium oxid from the phosphate rock to one molecular weight of silica in the potash feldspar rock, heating the mixture to a temperature at least as high as the sintering point, and treating the product with an acid.

6. The process of rendering available the phosphoric acid from substances containing di-calcium phosphate, comprising heating in a suitable furnace at a temperature of from 1000° to 1700° C a mixture of potash feldspar calcium phosphate rock, pulverizing the resulting product adding thereto suitable solvents and lixiviating the product to separate the phosphoric acid and the soluble salts.

7. The method of rendering available phosphoric acid from substances containing di-calcium phosphate, which consists in heating in a suitable furnace at a temperature of 1000° to 1700° C a mixture of potash feldspar and calcium phosphate rock, treating the resulting mass with solvents that will not cause insoluble phosphates or aluminates to form, leaching and treating the product to separate the phosphoric acid and the residual salts.

8. The method of making from potash carrying silicates a product containing di-calcium silicate, which comprises mixing the potash carrying silicates with masses containing tri-calcium phosphate, employing sufficient potash carrying silicates to provide one molecular weight of silica to two molecular weights of calcium oxid, heating the mixture and treating the resultant product to bring into solution the phosphoric acid and the resulting soluble salts.

9. As an article of manufacture, a product containing di-calcium silicate, free phosphoric acid, and a soluble potassium salt.

10. As an article of manufacture, a product containing di-calcium silicate, free phosphoric acid and an acid soluble compound of potash and alumina with said phosphoric acid.

Signed at Sewaren in the county of Middlesex and State of New Jersey this 21st day of Dec. A. D. 1912.

ALFRED HUTCHINSON COWLES.

Witnesses:
 FRANK NEER,
 CAROLYN B. NEER.